Figure 1:
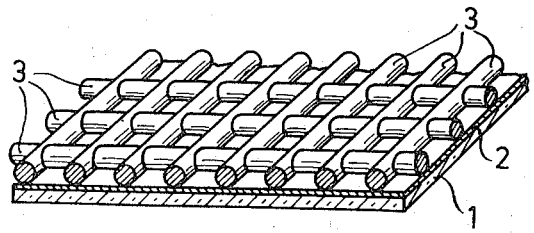
Figure 2:
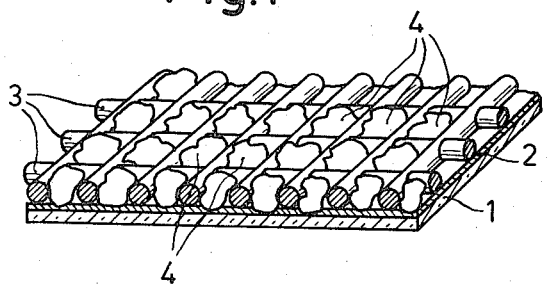

United States Patent
Oomen et al.

[11] 3,787,277
[45] Jan. 22, 1974

[54] MONO-GRAIN LAYER MEMBRANE

[75] Inventors: Joris Jan Cornelis Oomen; Donald Robert Wolters, both of Emmasingel, Eindhoven, Netherlands

[73] Assignee: U.S. Philips Corporation, New York, N.Y.

[22] Filed: May 12, 1972

[21] Appl. No.: 252,669

Related U.S. Application Data

[63] Continuation of Ser. No. 71,467, Sept. 11, 1970, abandoned.

[30] Foreign Application Priority Data

Sept. 18, 1969 Netherlands ............... 6914202

[52] U.S. Cl. .............. 161/87, 55/524, 55/528, 156/279, 161/92, 161/158, 210/500, 210/503, 51/298, 51/299, 117/21, 117/26, 117/25, 96/44

[51] Int. Cl. .............................. B32b 5/16

[58] Field of Search ....... 161/92, 93, 94, 95, 87, 88, 161/89, 111, 83, 114, 158; 210/500; 156/279; 55/524, 527, 528

[56] References Cited
UNITED STATES PATENTS

| | | | |
|---|---|---|---|
| 2,386,780 | 10/1945 | Cross .................................. | 161/87 |
| 543,964 | 8/1895 | Michell ............................... | 161/87 |
| 637,509 | 11/1899 | Henay ................................ | 161/87 |
| 3,322,608 | 5/1967 | Mason et al. ....................... | 161/87 |
| 3,171,772 | 3/1965 | Lomar et al. ....................... | 161/87 |
| 3,474,600 | 10/1969 | Tobias ................................ | 55/524 |
| 3,019,127 | 1/1962 | Czerwonka et al. ................ | 55/524 |

Primary Examiner—George F. Lesmes
Assistant Examiner—William R. Dixon, Jr.
Attorney, Agent, or Firm—Frank R. Trifari

[57] ABSTRACT

A membrane comprising a film of synthetic resin in which a piece of wire gauze is embedded. The apertures of the piece of wire gauze accommodate grains which protrude through the surface on one or both sides of the film. Such a membrane may be used as a partition between two compartments. Dependent on the properties of the grains, molecules, ions and/or electrons may be transported selectively from one compartment to the other.

3 Claims, 5 Drawing Figures

INVENTORS
JORIS J.C. OOMEN
DONALD R. WOLTERS

BY

AGENT

MONO-GRAIN LAYER MEMBRANE

This is a continuation of application Ser. No. 071,467 filed Sept. 11, 1970, now abandoned.

The invention relates to a monograin layer membrane comprising a single layer of grains which are embedded in a synthetic resin foil in which part of the surface of the grains on at least one side of the foil is not coated with a synthetic resin.

Such a membrane may be obtained as follows.

The grains to be embedded are scattered on a surface provided with a tacky layer. Those grains which are not fixed to the surface by the tacky layer are removed. A solution of a synthetic resin is provided in a thin layer on the single layer of grains left on the surface. The solvent is subsequently removed, for example, by heating the assembly. In this way a synthetic resin foil is formed. It is alternatively possible to use a solution of materials which form a synthetic resin as a result of chemical reaction after removal of the solvent. Heat may be required for removal of the solvent or for the chemical reaction.

The synthetic resin film with the embedded grains is subsequently detached from the surface, for example, by dissolving the adhesive layer. The result then is a membrane in which part of the surface of the grains on one side, namely that part of the surface by which the grains have adhered to the adhesive layer, is not coated with synthetic resin.

If membranes are desired in which on both sides part of the surface of the grains is free from synthetic resin the synthetic resin foil is removed to the necessary depth by partly etching or dissolving the resin foil away on that side of the membrane where the surface of the grains is to be freed from synthetic resin.

A membrane in which on both sides part of the surface of the grains is not coated with synthetic resin may alternatively be obtained by choosing the circumstances in the manufacture of the synthetic resin foil in such a manner that the synthetic resin retracts between the grains when the solvent is removed.

Dependent on the properties of the grains which are present in the mono-grain layer membranes obtained in accordance with these methods and dependent on the extent of accessibility of the grains, a more or less selective transport of molecules, ions and/or electrons through the membrane in a direction at right angles to the plane of the membrane is possible. Membranes of this kind may be used as partitions between two compartments containing media between which an exchange or transport of ions, molecules and/or electrons must take place. Examples of these uses are partitions in devices for dialysis and electrodialysis, fuel elements, accumulators, batteries, devices for separating gases, for selective permeation as in filtering devices and devices for reverse osmosis. Electron-conducting membranes may be used as electrodes in batteries. Semiconducting membranes may be used in solar cells and other semiconductor devices.

Particularly in those cases where a difference in pressure exists between the compartments which are separated by such membranes it is desirable to have strong and also flexible membranes available at the lowest possible resistance to transport of the molecules, ions and/or electrons.

The amount of molecules, ions and/or electrons which can be transported by the membrane per $cm^2$ depends on the amount of grains, present per $cm^2$.

The cracking strength of membranes containing a great amount of grains manufactured in accordance with the methods described above is not high enough for certain uses.

It is an object of the present invention to provide a membrane which has a high mechanical strength and a low transport resistance through the membrane for ions molecules and/or electrons, while the density of the grains is as high as possible.

According to the invention this object is satisfied by a membrane which is characterized in that the grains are provided in the apertures in a piece of wire gauze which is embedded in the synthetic film together with the grains.

Such a membrane has a high strength because the piece for wire gauze serves as a reinforcement of the film. In addition the membrane construction according to the invention has the great advantage that differences in grain density cannot substantially occur due to the arranging function of wire gauze. Such differences in grain density are possible in the known constructions. The construction renders it also possible to provide the grains or different kinds of grains in the membrane according to certain patterns.

It is readily evident that grains of any kind may be present in the membrane according to the invention and that the construction as such is independent of the nature of the grains. The grains may consist of, for example: ion-exchange material such as cation-exchange or anion-exchange resins; electrically conducting materials such as carbon, metals or semiconducting materials; materials which pass molecules of a certain size commercially known as "molecular sieves" or materials which exclusively pass cations or anions of a certain size. The said materials are known in the art and are commercially available, a detailed description of which may be found, if desired, in the relevant litterature on this subject.

The piece of wire gauze present in the membrane may be manufactured from wires of natural or synthetic polymers such as natural silk, nylon, polyester, polyvinylidenechloride, glass fibres, metals or alloys such as stainless steel, phosphor bronze, nickel and nickel alloys. Combinations of metal wires and wires of other materials are alternatively possible. The pieces of wire gauze may be obtained by weaving or by interconnecting, for example, by means of knotting, welding or otherwise attaching two or more layers of crossed parallel wires at their points of intersection, the wires being located relatively to one another at a given angle in the successive layers. Pieces of wire gauze from synthetic resin may alternatively be obtained by extrusion. The apertures in the wire gauze may be, for example, square or hexagonal. The piece of wire gauze may have apertures of mutually different shapes and dimensions which may each comprise, for example, a grain material having a different function. In this connection a piece of wire gauze is also understood to mean a material obtained by the provision of a large number of apertures in a metal or synthetic resin film.

The membrane preferably comprises a piece of wire gauze whose apertures have dimensions such that they provide room for one or more grains. A maximum strength of the membrane is obtained in a preferred embodiment in which each aperture accommodates one grain whose diameter approximately corresponds to the dimensions of the aperture.

The membranes according to the invention may be manufactured in accordance with several methods which are different in detail but mainly consist of two manufacturing stages.

The first manufacturing stage generally consists in a temporary fixation of the grains in the apertures of the piece of wire gauze. During the second manufacturing stage the grains together with the piece of wire gauze are combined to form an assembly while forming a film with the aid of a synthetic resin. If during the latter stage a great part of the surface of the grains which is sufficient for transport through the membrane does not remain free from synthetic resin, part of the synthetic resin may be removed again in a possible third manufacturing stage.

The temporary fixation of the grains in the apertures of a piece of wire gauze may be effected, for example, by providing an adhesive layer on a flat surface, spreading a piece of wire gauze on the adhesive layer and subsequently scattering grains on the piece of wire gauze. Part of the grains fills the apertures in the piece of wire gauze and adheres to the adhesive layer, the other grains may easily be removed by brushing them off or sucking them up.

In this modification of the method the surface of a glass or metal plate may be used, for example, as the flat surface. A thin layer of adhesive is spread on the surface. It has been found that suitable adhesives for this purpose consist of highly viscous solutions of natural and synthetic rubbers, for example polyisoprene.

It is possible to use commercially available adhesive films for this purpose.

The adhesive layer may alternatively be obtained with the aid of a positive or negative photoresist. To this end a layer of photoresist is provided on the flat surface. The photoresist is subsequently exposed in accordance with a certain pattern and is then developed. The parts of the photoresist left on the surface are somewhat tacky after development and before drying, or may be made tacky with the aid of a solvent. The commercially available photoresists may be used for this purpose.

After the grains are fixed in the apertures of the piece of wire gauze and the grains which have not adhered to the tacky surface are removed, a solution of a synthetic resin or of materials which form a synthetic resin after a chemical reaction, is poured out in a thin layer onto the piece of wire gauze. The solvent is subsequently removed, for example, by heating the assembly to form a film consisting of the relevant synthetic resin.

All synthetic resins forming a film under these circumstances are in principle suitable for this purpose. Examples of such synthetic resins are inter alia: polyester resins, polycarbonate resins, polyamide resins, phenolformaldehyde resins, polyurethane resins and epoxy resins.

Unless this method is performed in such a manner that the synthetic resin retracts between the grains upon formation, it may be necessary that part of the film is removed after the formation of the film so that part of the surface of the grains is free from synthetic resin. This may be effected by scouring the film, dissolving it partially, saponifying it or etching it away with the aid of an acid with or without the presence of an oxidant. According to a further modification of the method of manufacturing a membrane according to the invention a piece of wire gauze is used whose wires are already coated with a thermoplastic synthetic resin or a thermo-setting synthetic resin which is in a so-called B-stage so that it first melts or softens upon heating and then forms a coherent foil before hardening. The previously mentioned synthetic resins for the manufacture of the synthetic resin film may also be used for this purpose.

The piece of wire gauze is laid on an adhesive layer in the manner previously described, grains are scattered on the piece of wire gauze and the superfluous grains are removed. The membrane is then obtained by heating the assembly during which the synthetic resin on the piece of wire gauze softens and forms a coherent film which also hardens if a thermosetting synthetic resin is used.

The synthetic resin on the piece of wire gauze may be used to fix the grains temporarily when these are provided. To this end the synthetic resin is made tacky, for example, by treating it with a solvent or with the vapors of a solvent. After providing the grains the solvent is removed, for example, by heating and the synthetic resin film is formed. It is of course alternatively possible to coat the piece of wire gauze with a tacky substance (adhesive), to accommodate the grains in the apertures and subsequently to form the synthetic resin film by coating the assembly with a solution of a synthetic resin as previously described.

The grains may be provided in the membrane according to certain patterns by using a photoresist. This may be effected in several manners.

For example, the apertures in certain parts of the piece of wire gauze may be closed according to a certain pattern. To this end the piece of wire gauze is coated, for example, with a photoresist. The resist layer is exposed in accordance with the desired pattern and is subsequently developed. Grains may then be provided in the apertures which are not closed by the photoresist by means of any of the methods previously described.

It is alternatively possible to fix the grains in the piece of wire gauze according to a certain pattern by means of a photomechanical method.

In that case operations may, for example, be carried out as follows. The piece of wire guaze is immersed in a photoresist and is retreated therefrom so slowly that a thin, homogeneous resist is left on the piece of wire gauze. After drying a structure is usually obtained in which only the wires are coated with a photoresist. The piece of wire gauze is then exposed in accordance with the desired pattern, whereafter the photoresist is developed with a solvent. Photoresist is then left on the desired wires. Upon development the insoluble part of the photoresist usually becomes somewhat tacky, but if this might not be the case a solvent may generally be found by which the resist can be made tacky.

The grains are then provided on the areas in the piece of wire gauze which have been made tacky.

It is of course alternatively possible to provide the photoresist on a substrate, to subsequently expose the photoresist in accordance with a certain pattern and thereafter to develop it. The piece of wire gauze is spread on the substrate on which the tacky photoresist has been provided according to a certain pattern. Grains are sprinkled on the piece of wire gauze. The grains which have not adhered to the substrate are removed. Subsequently, the monograin layer membrane is finished in accordance with any of the previously described methods. A method of manufacturing a membrane according to the invention will now be described more fully with reference to the accompanying drawing.

In the drawing FIGS. 1 to 5 illustrate cross-sectional views of different stages of this method.

A tacky layer 2 is provided on a substrate 1. A piece of wire gauze 3 is spread on this layer. The wire gauze consists of two layers of mutually parallel wires which intersect each other at an angle of 90°. The wires are welded together at their points of intersection.

Figure 3:
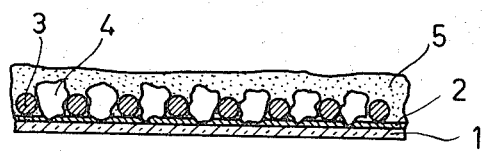
Figure 4:
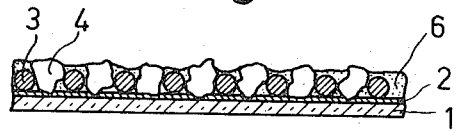

Grains 4 are scattered on the piece of wire gauze, the largest dimension of the grains being somewhat smaller than the smallest diameter of the apertures in the piece of wire gauze (in this case slightly smaller than the side of the square apertures in the piece of wire gauze). A number of these grains 4 fall into the apertures in the piece of wire gauze 3 and are held by the tacky layer 2. After removal of superfluous grains the structure is obtained which is shown in a perspective side elevation in FIG. 2. A solution of a synthetic resin 5 is poured out onto the grains 4 (FIG. 3). When removing the solvent the layer 5 shrinks and retracts between grains 4. When correctly choosing the circumstances (which must be experimentally determined from case to case) it may be achieved that the ultimately formed synthetic film 6 does not cover the grains over part of their surface on the side remote from the substrate 1. The membrane (consisting of the grain 4 and the piece of wire gauze 3 embedded in the synthetic film 6) is then detached from the substrate.

Figure 5:

This may be effected, for example, by dissolving the tacky layer 2 in a solvent which does not affect the synthetic film. A membrane as is shown in a cross-sectional side elevation in FIG. 5 is ultimately obtained.

Several embodiments of membranes according to the invention will now further be described with reference to the following examples, where dimensions are expressed in microns ($\mu$m for micrometers).

EXAMPLE I.

A piece of wire gauze having square apertures of 60 $\mu$m × 60 $\mu$m manufactured from nylon wires, diameter of wires: 30 $\mu$m, was covered on one side with an adhesive film consisting of a flexible support provided with a layer of polyisoprene rubber. Grains having a diameter of between 37 and 44 $\mu$m of a cation-exchange material mainly consisting of a styrenedivinylbenzene copolymer were scattered on the side of the piece of wire gauze remote from the adhesive film. The grains which did not adhere to the adhesive film were subsequently brushed off. The assembly forming the piece of wire gauze, adhesive film and grains left thereon was subsequently immersed in a solution comprising:

500 g "Desmopheen 1200" (Bayer)
600 g "Desmodur L" (Bayer)
400 g ethylacetate

Desmopheen 1200 is a branched polyester obtained by condensation of adipic acid propanetriol and butylene glycol. Desmodur L contains the addition product of 2,2- dioxymethyl butanol - 1 incuding a mixture of 2,4 - toluene diisocyanate and 2,6 - toluene diisocyanate (65: 35).

The assembly was subsequently lifted out of the solution and heated for 16 hours at 100°C. The solvent was then removed and a film of polyurethane resin was formed from the above-mentioned components. Part of the surface of the grains were not coated with polyurethane resin. The adhesive film was then removed by immersing the assembly in xylene during which the polyisoprene rubber partially dissolved and lost its adhesive strength. The membrane obtained in this manner had a permselectivity which is better than 99 percent. The electric resistance was approximately 9 $\Omega$ sq.cm.

EXAMPLE II.

A piece of wire gauze consisting of nylon wires (diameter 30 $\mu$m) having square apertures of 60 $\mu$m was immersed in a polyisoprene solution (10 gms of polyisoprene per 100 mls of xylene) and was subsequently retreated from this solution so slowly that a thin, homogeneous layer covered the piece of wire gauze. The solvent was evaporated at 20°C ambient temperature. A piece of wire gauze was obtained whose wires are enveloped by a thin film of polyisoprene. Grains comprising sulphonated styrenedivinylbenzene copolymer having cation-exchange properties were subsequently scattered on the piece of wire gauze. The grains had a size of between 36 $\mu$m and 45 $\mu$m. The grains were pressed into the apertures of the piece of wire gauze with the aid of a roller. A coherent film was formed after 16 hours of heating at 100°C. Part of the surface of the grains protruded on either side from the film surface.

EXAMPLE III

A thin layer of a commercially available photoresist was spread on the surface of a glass plate. The photoresist was exposed in accordance with a desired pattern while using a mask. The exposed layer was subsequently developed and post-treated as prescribed by the manufacturer of the resist. Subsequently the photoresist patterns left on the glass plate were made tacky by means of a solvent, in this case by xylene. A piece of wire gauze was then spread on the glass plate. The membrane was further obtained in the manner as described in Example I. The ultimate result was a membrane comprising the grains distributed in accordance with a certain pattern.

What is claimed is:

1. A mono-grain layer membrane which comprises a piece of wire gauze; a layer of grains having a thickness of one grain diameter disposed in the apertures of said wire gauze, the dimensions of each of said grains being such that said grains fit within the area created by said apertures, the smallest dimension of each of said grains being larger than the diameter of the wire of said wire gauze; a synthetic resin disposed between said grains and provided within said apertures, said synthetic resin binding said grains and said wire gauze together and wherein part of the surface of said grains on at least one side of said membrane are not coated with said synthetic resin.

2. A mono-grain layer membrane as claimed in claim 1, wherein said wire gauze has apertures which provide room for only one of said grains.

3. A mono-grain layer membrane comprising a wire gauze, the apertures of which have disposed therein grains, said grains and wire gauze being embedded in a synthetic resin film.

* * * * *